United States Patent
Kornblit et al.

(10) Patent No.: US 7,156,032 B2
(45) Date of Patent: Jan. 2, 2007

(54) METHOD AND APPARATUS FOR CONTROLLING FRICTION BETWEEN A FLUID AND A BODY

(75) Inventors: Avinoam Kornblit, Highland Park, NJ (US); Timofei Nikita Kroupenkine, Warren, NJ (US); Mary Louise Mandich, Martinsville, NJ (US); Tobias Manuel Schneider, Marburg (DE); Joseph Ashley Taylor, Springfield, NJ (US); Donald Weiss, Cresskill, NJ (US); Shu Yang, Philadelphia, PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/649,285

(22) Filed: Aug. 27, 2003

(65) Prior Publication Data
US 2005/0039661 A1 Feb. 24, 2005

Related U.S. Application Data

(60) Provisional application No. 60/497,262, filed on Aug. 22, 2003.

(51) Int. Cl.
*B63B 1/34* (2006.01)
*B64C 21/00* (2006.01)

(52) U.S. Cl. .................................... 114/67 R

(58) Field of Classification Search .......... 114/67 R, 114/67 A, 20.1, 312; 244/200, 204, 205, 244/130
See application file for complete search history.

(56) References Cited

U.S. PATENT DOCUMENTS

| 1,909,186 A | * | 5/1933 | Lougheed | .................... 244/200 |
| 2,322,632 A | * | 6/1943 | Harper, Jr. | .................. 244/200 |
| 3,510,094 A | * | 5/1970 | Clark | .......................... 244/130 |

(Continued)

FOREIGN PATENT DOCUMENTS

DE 197 04 207 A1 8/1998

(Continued)

OTHER PUBLICATIONS

U.S. Appl. No. 10/798,064, filed Mar. 11, 2004, Arney et al.

(Continued)

*Primary Examiner*—Ajay Vasudeva
(74) *Attorney, Agent, or Firm*—David W. Herring; Donald P. Dinella (57) ABSTRACT

A method and apparatus is disclosed wherein nanostructures or microstructures are disposed on a surface of a body (such as a submersible vehicle) that is adapted to move through a fluid, such as water. The nanostructures or microstructures are disposed on the surface in a way such that the contact between the surface and the fluid is reduced and, correspondingly, the friction between the surface and the fluid is reduced. In an illustrative embodiment, the surface is a surface on a submarine or other submersible vehicle (such as a torpedo). Illustratively, electrowetting principles are used to cause the fluid to at least partially penetrate the nanostructures or microstructures on the surface of the body in order to selectively create greater friction in a desired location of the surface. Such penetration may be used, for example, to create drag that alters the direction or speed of travel of the body.

6 Claims, 8 Drawing Sheets

U.S. PATENT DOCUMENTS

| | | | | |
|---|---|---|---|---|
| 3,554,154 | A * | 1/1971 | Thomas | 114/222 |
| 3,957,008 | A * | 5/1976 | McCormick et al. | 114/67 A |
| 4,429,652 | A * | 2/1984 | Stol | 114/20.1 |
| 5,320,309 | A * | 6/1994 | Nosenchuck et al. | 244/205 |
| 5,359,951 | A * | 11/1994 | Meng | 114/67 R |
| 5,476,056 | A * | 12/1995 | Tokunaga et al. | 114/67 A |
| 5,791,275 | A * | 8/1998 | Bandyopadhyay | 114/67 R |
| 5,934,622 | A * | 8/1999 | Meng | 244/205 |
| 5,941,481 | A * | 8/1999 | Snarski | 244/204 |
| 5,964,433 | A * | 10/1999 | Nosenchuck | 244/205 |
| 6,059,236 | A * | 5/2000 | Tsunoda | 244/201 |
| 6,079,345 | A * | 6/2000 | Tsunoda | 114/67 R |
| 6,185,961 | B1 | 2/2001 | Tonucci et al. | 65/60.4 |
| 6,220,549 | B1 * | 4/2001 | Tsunoda et al. | 244/205 |
| 6,520,455 | B1 * | 2/2003 | Karniadakis et al. | 244/204 |
| 2004/0069195 | A1 * | 4/2004 | Goldstein | 114/67 R |

FOREIGN PATENT DOCUMENTS

| | | | |
|---|---|---|---|
| DE | 19704207 A1 * | 8/1998 | |
| JP | 05147572 A * | 6/1993 | |
| JP | 08128413 A * | 5/1996 | |
| JP | 2001114185 A * | 4/2001 | |
| JP | 2002266816 A * | 9/2002 | |
| WO | WO 2081303 A1 * | 10/2002 | |

OTHER PUBLICATIONS

U.S. Appl. No. 10/806,543, filed Mar. 23, 2004, Arney et al.
U.S. Appl. No. 10/816,569, filed Apr. 1, 2004, Gasparyan et al.
U.S. Appl. No. 10/674,448, filed Sep. 30, 2003, Hodes et al.
U.S. Appl. No. 10/803,565, filed Mar. 18, 2004, Hodes et al.
U.S. Appl. No. 10/803,641, filed Mar. 18, 2004, Hodes et al.
U.S. Appl. No. 10/403,159, filed Mar. 31, 2003, Kornblit et al.
U.S. Appl. No. 10/716,084, filed Nov. 18, 2003, Kroupenkine et al.
U.S. Appl. No. 10/803,576, filed Mar. 18, 2004, Kroupenkine et al.
U.S. Appl. No. 10/810,774, filed Mar. 26, 2004, Kroupenkine et al.
Kim, et al., "*Nanostructured Surfaces for Dramatic Reduction of Flow Resistance in Droplet-Based Microfluidics,*" IEEE, pp. 479-482 (2002).

* cited by examiner

METHOD AND APPARATUS FOR CONTROLLING FRICTION BETWEEN A FLUID AND A BODY

CROSS REFERENCE TO RELATED APPLICATIONS

This application claims priority to U.S. Provisional Patent Application, Ser. No. 60/497,262, entitled Method and Apparatus for Reducing Friction Between a Fluid and a Body, filed Aug. 22, 2003.

FIELD OF THE INVENTION

The present invention relates generally to reducing friction on moving bodies and, more particularly, controlling such friction by using extremely small, predetermined surface features disposed on the surface of the body.

BACKGROUND OF THE INVENTION

Many beneficial devices or structures in myriad applications are characterized at least in part by having a surface that moves through or is in contact with at least one fluid. In many cases, friction between the device or structure and the fluid is of paramount concern. For example, underwater vehicles (such as submarines or torpedoes), which are capable of maneuvering partially or entirely under water, experience a high level of friction due to the contact between the water and the surface of the vehicle. Since water is very dense, such vehicles experience significant friction. The drag forces caused by friction reduce the maximum speed at which the vehicle can travel and increase the amount of noise generated by the movement of the vehicles—both of which may be undesirable. Therefore, it is desirable to reduce such friction to the maximum extent possible. Traditional methods of reducing friction were typically based upon optimizing the aerodynamic/hydrodynamic shape of vehicle surfaces and/or utilizing materials for vehicle surfaces having reduced friction properties.

SUMMARY OF THE INVENTION

While prior attempts to reduce friction between a fluid and a surface moving through that fluid were effective in many regards, we have realized that it would be advantageous to further reduce this friction. Such a reduction would have the effect of minimizing the detrimental drag effects of friction and would decrease the drag on underwater vehicles thus increasing the maximum speed and reducing the noise generated by those vehicles. Since less power is required to propel a vehicle experiencing lower friction, we have also recognized that fuel requirements would be reduced.

Therefore, we have invented a method and apparatus wherein nanostructures or microstructures are disposed on a surface of a body (such as a submersible vehicle) that is adapted to move through a fluid, such as water. The nanostructures or microstructures are disposed on the surface in a way such that the contact between the surface and the fluid is reduced and, correspondingly, the friction between the surface and the fluid is reduced. In an illustrative embodiment, the surface is a surface on a submarine or other submersible vehicle (such as a torpedo). Electrowetting principles are used to cause the fluid to at least partially penetrate the nanostructures or microstructures on the surface of the body in order to selectively create greater friction in a desired location of the surface. Such penetration may be used, for example, to create drag that alters the direction or speed of travel of the body.

DETAILED DESCRIPTION

Reducing the friction between a fluid and a body moving through that fluid is highly desirable in many situations. We have realized that such reductions may be achieved by using nanostructured or microstructured surfaces on such bodies. To date, nanostructures and/or microstructures have primarily been used in microfluidics applications (for example, small amounts of fluid disposed, illustratively, in a channel) to reduce the flow resistance exerted on the droplet. These applications are useful in understanding how nanostructures or microstructures can be used to reduce flow resistance of a liquid in contact with the surface. One such application is described in "Nanostructured Surfaces for Dramatic Reduction of Flow Resistance in Droplet-based Microfluidics", J. Kim and C. J. Kim, IEEE Conf. MEMS, Las Vegas, Nev., January 2002, pp. 479–482, which is hereby incorporated by reference herein in its entirety. The Kim reference teaches that, by finely patterning the surface in contact with the liquid droplet, and using principles of liquid surface tension, discussed below, it is possible to greatly increase the contact angle between the surface and the droplet. Such an increase in the contact angle is caused by substantial decrease in the liquid-solid contact area and thus directly correlates to a reduced flow resistance experienced by the droplet disposed on the surface. The choice of different patterns on the surface will lead to different droplet contact angles and, hence, different levels of flow resistance.

Figure 1A:
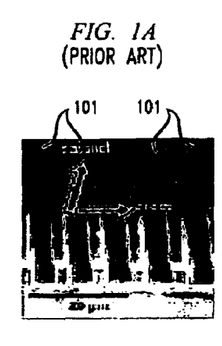
FIG. 1A shows a prior art microline surface.
Figure 1B:
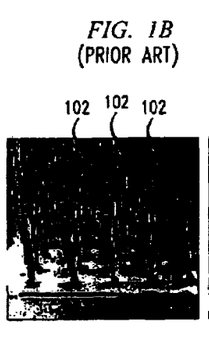
FIG. 1B shows a prior art micropost surface.
Figure 1C:
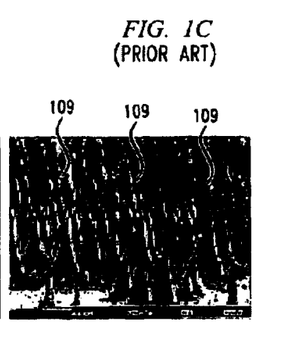
FIG. 1C shows a prior art nanopost surface.
Figure 1D:
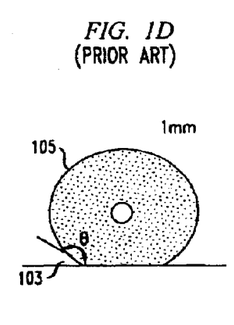
FIG. 1D shows a droplet of liquid disposed on the prior art surface of FIG. 1A and the corresponding contact angle that results between the droplet and that surface.
Figure 1E:
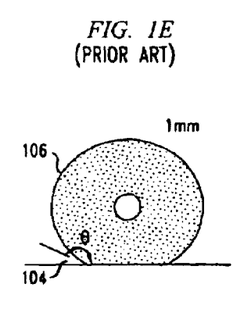
FIG. 1E shows a droplet of liquid disposed on the prior art surface of FIG. 1B and the corresponding contact angle that results between the droplet and that surface.

FIGS. 1A–1F illustratively show how different microstructure and nanostructure surface patterns result in different contact angles between the resulting surface and a droplet of liquid. FIGS. 1A and 1B show a microline surface and a micropost surface, respectively. Each of the lines 101 in FIG. 1A is approximately 3–5 micrometers in width and each of the microposts 102 in FIG. 1B is approximately 3–5 micrometers in diameter at its widest point. Comparing the microline pattern to the micropost pattern, for a given size droplet disposed on each of the surfaces, the contact area of the droplet with the microline pattern will be greater than the contact area of the droplet with the micropost pattern. FIGS. 1D and 1E show the contact angle of a droplet relative to the microline surface of FIG. 1A and the micropost surface of FIG. 1B, respectively. The contact angle 103 of the droplet 105 on the microline pattern is smaller (~145 degrees) than the contact angle 104 of the droplet 106 with the micropost pattern (~160 degrees). As described above, it directly follows that the flow resistance exerted on the droplet by the microline pattern will be higher than that exerted by the micropost pattern.

FIG. 1C shows an even finer pattern than that of the microline and micropost pattern. Specifically, FIG. 1C shows a nanopost pattern with each nanopost 109 having a diameter of less than 1 micrometer. While FIG. 1C shows nanoposts 109 formed in a somewhat conical shape, other shapes and sizes are also achievable. In fact, cylindrical nanopost arrays have been produced with each nanopost having a diameter of less than 10 nm. Specifically, FIGS. 2A–2E show different illustrative arrangements of nanoposts produced using various methods and further show that such various diameter nanoposts can be fashioned with different degrees of regularity. Moreover, these figures show that it is possible to produce nanoposts having various diameters separated by various distances. An illustrative method of producing nanoposts, found in U.S. Pat. No. 6,185,961, titled "Nanopost arrays and process for making same," issued Feb. 13, 2001 to Tonucci, et al, is hereby incorporated by reference herein in its entirety. Nanoposts have been manufactured by various methods, such as by using a template to form the posts, by various means of lithography, and by various methods of etching.

Figure 1F:
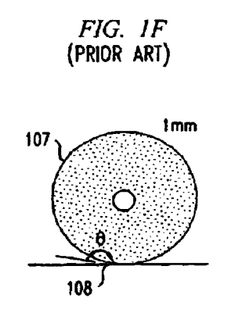
FIG. 1F shows a droplet of liquid disposed on the prior art surface of FIG. 1C and the corresponding contact angle that results between the droplet and that surface.
Figure 2A:
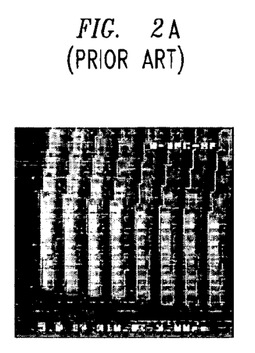
FIGS. 2A, 2B, 2C, 2D and 2E show various prior art nanostructure feature patterns of predefined nanostructures that are suitable for use in the present invention.
Figure 2B:
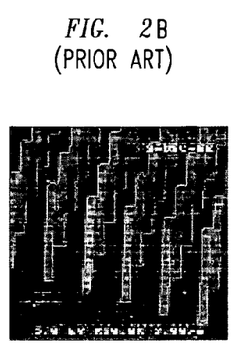
Figure 2C:
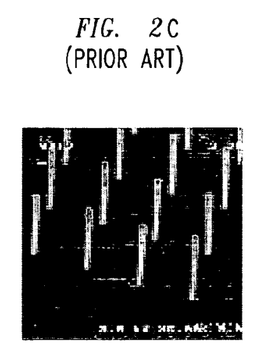
Figure 2D:
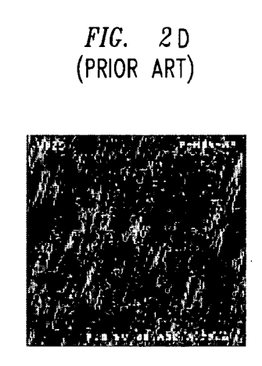
Figure 2E:
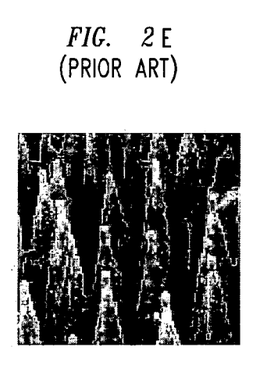
Figure 3:
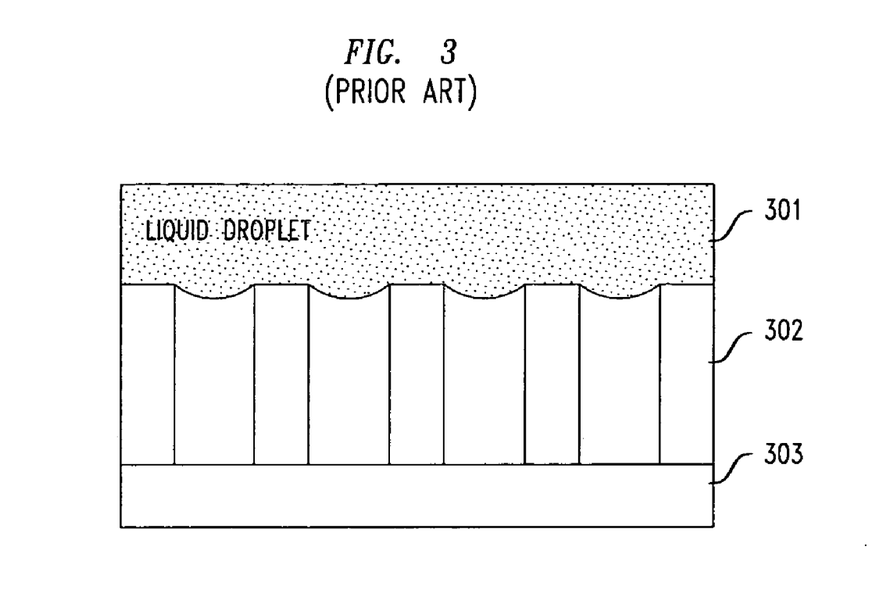
FIG. 3 shows an illustrative prior art device wherein a liquid droplet is disposed on a nanostructured feature pattern.

Referring to FIG. 1F, a droplet 107 disposed on the nanopost surface of FIG. 1C, is nearly spherical with a contact angle 108 between the surface and the droplet equal to between 175 degrees and 180 degrees. The droplet 107 disposed on this surface experiences nearly zero flow resistance. As a result, as is noted by the Kim reference, prior attempts at placing a droplet on such a surface were problematic, as this extremely low flow resistance made it almost impossible to keep the water droplets stationary on the nanostructured surface. As shown in FIG. 3, the reason for this low flow resistance is that the surface tension of droplet 301 of an appropriate liquid (depending upon the surface structure) will enable the droplet 301 to be suspended on the tops of the nanoposts with no contact between the droplet and the underlying solid surface. This results in an extremely low area of contact between the droplet and the surface (i.e., the droplet only is in contact with the top of each post 302) and, hence low flow resistance.

The present inventors have recognized that, unlike in prior attempts of using nanostructures or microstructures, such as described in the Kim reference, which strictly focused reducing friction in microfluidic applications (i.e., a droplet of fluid moving across the surface of a body), surfaces with low flow resistance may be useful on bodies that move through a fluid, either liquid or gas. The same principles discussed above relating to low flow resistance equally apply to such surfaces. For example, in one embodiment in accordance with the principles of the present invention, a surface having microstructures or nanostructures may be used on underwater vehicles, such as submarines or torpedoes. As the underwater vehicle moves through the water, friction along the surfaces of the vehicle lead to increased drag along those surfaces. Drag is defined herein as a force caused by friction that is exerted on a moving body in a direction opposite the speed of travel of that body. Drag experienced by a given body increases nonlinearly as a function of the velocity of the body. Such drag results in a lower maximum vehicle speed (because more power is required to overcome the drag experienced by the vehicle) and may result in a larger sonic signature as the vehicle moves through the water. However, by patterning the surface or a portion of the surface of the vehicle with nanostructures or microstructures, as described above, friction will be reduced on the surface of the underwater vehicle leading to a higher maximum speed and a reduced noise signature. Another benefit of reduced friction/drag is that a lower power is necessary to propel the vehicle at a given speed. As a result, a lower fuel/energy amount is required to drive the vehicle at that speed.

Figure 4:
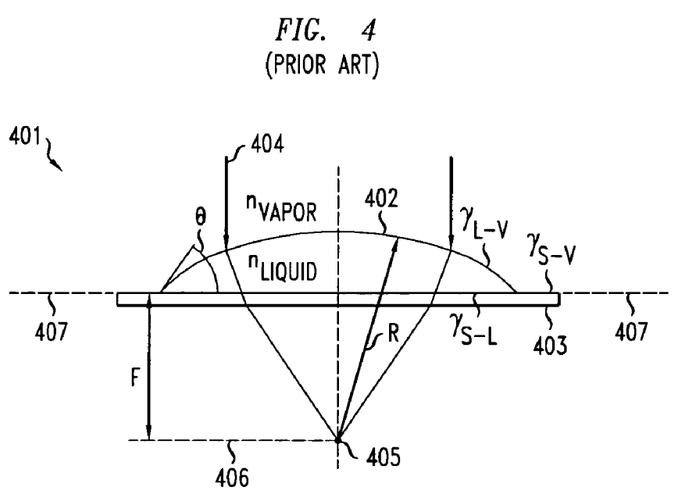
FIG. 4 shows a prior art microlens device that illustrates the interaction of a liquid disposed on a substrate.

We have also recognized that it would be desirable to use electrowetting principles, coupled with the above-described nano- or micro-structured surfaces, to vary the characteristics of the movement of underwater vehicles. The operations of electrowetting principles are best illustrated by examining a droplet of liquid disposed on a surface. FIG. 4 shows one such illustrative prior art embodiment of small liquid droplet 402 disposed on a surface in a way such that it forms a liquid microlens 401. Such a liquid microlens is the subject of U.S. Pat. No. 6,538,823, issued Mar. 25, 2003, entitled "Tunable Liquid Microlens" and U.S. Pat. No. 6,545,815, issued Mar. 25, 2003, entitled "Tunable Liquid Microlens With Lubrication Assisted Electrowetting." Both of these Patents are hereby incorporated by reference herein in their entirety. The microlens embodiment of FIG. 4 is useful to demonstrate the interaction between any droplet of liquid and the surface on which it is disposed, whether or not the droplet and surface are part of a microlens or another application. In FIG. 4, droplet 402 is a droplet of a transparent liquid, such as water, typically (but not necessarily) with a diameter from several micrometers to several millimeters. The droplet is disposed on a transparent substrate 403 which is typically hydrophobic or includes a hydrophobic coating. The contact angle θ between the droplet and the substrate is determined by interfacial surface tensions (also known as interfacial energy) "γ", generally measured in milli-Newtons per meter (mN/m). As used herein, $\gamma_{S\text{-}V}$ is the interfacial tension between the substrate 403 and the air, gas or other liquid that surrounds the substrate, $\gamma_{L\text{-}V}$ is the interfacial tension between the droplet 402 and the air, gas or other liquid that surrounds the droplet, and $\gamma_{S\text{-}L}$ is the interfacial tension between the substrate 403 and the droplet 402. The contact angle θ may be determined from equation (1):

$$\cos \theta = (\gamma_{S\text{-}V} - \gamma_{S\text{-}L})/\gamma_{L\text{-}V}$$　　　Equation (1)

Equation (1) applies to any instance where a droplet of liquid is disposed on a surface, whether or not the droplet is used as a microlens.

Figure 5:
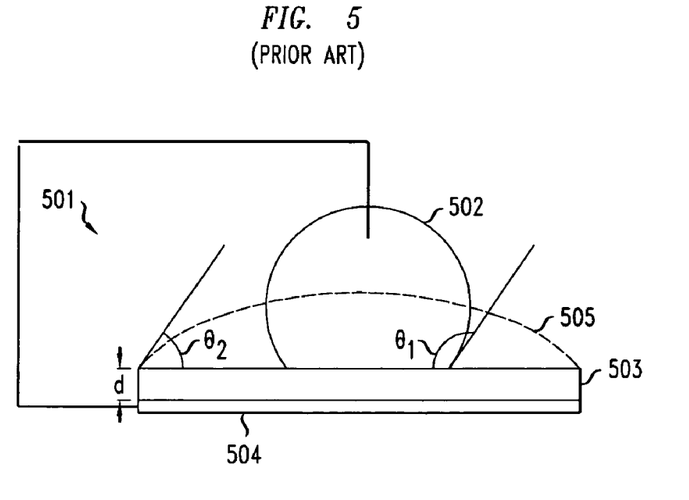
FIG. 5 shows how prior art electrowetting principles used with the microlens of FIG. 1 can be used to move the droplet in a predetermined direction across a substrate.

In the microlens embodiment of FIG. 4 and in other instances where a liquid is disposed on a surface, it is often desirable to be able to change the shape of the droplet. FIG. 5 shows a prior art microlens 501, similar to the microlens of FIG. 4, whereby the phenomenon of electrowetting is used to change the shape of the droplet by reversibly changing the contact angle θ between droplet 502 of a conducting liquid and a dielectric insulating layer 503 having a thickness "d" and a dielectric constant $\in_r$. An electrode, such as metal electrode 504, is positioned below the dielectric layer 503 and is insulated from the droplet 502 by that layer. The droplet 502 may be, for example, a water droplet, and the dielectric insulating layer 503 may be, for example, a Teflon/Parylene surface.

When no voltage difference is present between the droplet 502 and the electrode 504, the droplet 502 maintains its shape defined by the volume of the droplet and contact angle $\theta_1$, where $\theta_1$ is determined by the interfacial tensions y as explained above. When a voltage V is applied to the electrode 504, the voltage difference between the electrode 504 and the droplet 502 causes the droplet to spread. The dashed line 505 illustrates that the droplet 502 spreads equally across the layer 503 from its central position relative to the electrode 504. Specifically, the contact angle θ decreases from $\theta_1$ to $\theta_2$ when the voltage is applied between the electrode 504 and the droplet 502. By using separate electrodes under different parts of the droplet, and varying the voltage to those individual electrodes, spreading of the droplet can be achieved such that the droplet moves from its centered position to another desired position. Such a movement is described in the aforementioned Patents. The voltage V necessary to achieve this spreading, whether to change the shape of the droplet or its position, may range from several volts to several hundred volts. The amount of spreading, i.e., as determined by the difference between $\theta_1$ and $\theta_2$, is a function of the applied voltage V. The contact angle $\theta_2$ can be determined from equation (4):

$$\cos \theta(V) = \cos \theta(V=0) + V^2(\in_0 \in_r)/(2d\gamma_{L\text{-}V})$$　　　Equation (4)

where $\cos \theta(V=0)$ is the contact angle between the insulating layer 503 and the droplet 502 when no voltage is applied between the droplet 502 and electrode 504; $\gamma_{L\text{-}V}$ is the droplet interfacial tension described above; $\in_r$ is the dielectric constant of the insulating layer 503; and $\in_0$ is $8.85 \times 10^{-12}$ F/M—the permittivity of a vacuum.

In implementations such as the liquid microlens described above, while the surface upon which the droplet is disposed is hydrophobic, the characteristics of that surface are such that the droplet flattens significantly at the area where it comes into contact with the surface. Thus, due to the resulting large contact area between the surface and the droplet, a significant amount of flow resistance is present between the surface and the droplet. This is desirable in the above microlens because, if there were too little flow resistance present, the droplet would freely move and it would become impossible to maintain the droplet in its desired stationary position or shape in the absence of other means for controlling the droplet. However, in many instances, it is often desirable to reduce the flow resistance experienced by a liquid on a surface.

The above-described electrowetting principles can be used with nanostructured surfaces. For example, in a recent attempt, a droplet of liquid disposed on a nanostructured surface was controllably moved without being disposed in a channel. This attempt is described in copending U.S. patent application Ser. No. 10/403,159 entitled "Method And Apparatus For Variably Controlling The Movement Of A Liquid On A Nanostructured Surface," which is hereby incorporated by reference in its entirety herein. The attempt described in the '159 application accomplished controlled movement of a liquid droplet by selecting the intra-pattern characteristics of the feature pattern. Such intra-pattern characteristics could be either a) the individual feature pattern elements relative to other elements, or b) certain characteristics of individual feature pattern elements such as shape, size, height and electrical characteristics.

Figure 6:
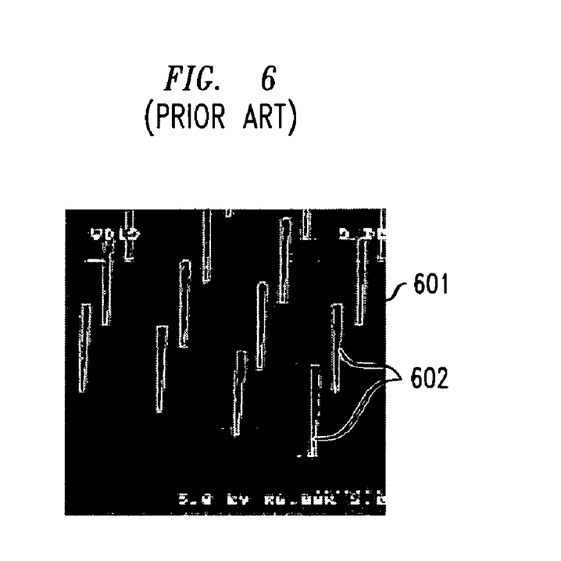
FIG. 6 shows a more detailed view of the prior art nanostructure feature pattern of FIG. 4C.

FIG. 6 shows an illustrative known surface 601 with a nanostructure feature pattern of nanoposts 602 disposed on the surface. Throughout the description herein, one skilled in the art will recognize that the same principles applied to the use of nanoposts or nanostructures can be equally applied to microposts or other larger features in a feature pattern. The surface 601 and the nanoposts 602 of FIG. 6 are, illustratively, made from silicon. The nanoposts 602 of FIG. 6 are illustratively approximately 350 nm in diameter, approximately 6 μm high and are spaced approximately 4 μm apart, center to center. It will be obvious to one skilled in the art that such arrays may be produced with regular spacing or, alternatively, with irregular spacing.

Figure 7A:
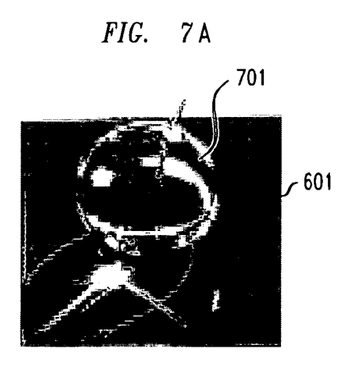
FIGS. 7A, 7B, 7C and 7D show droplets of different liquid having different surface tensions disposed on the nanostructure feature pattern of FIG. 6.
Figure 7B:
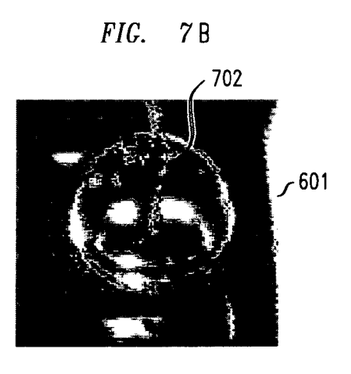
Figure 7C:
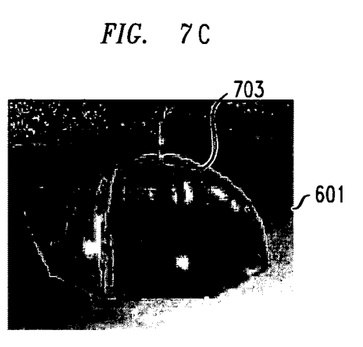
Figure 7D:
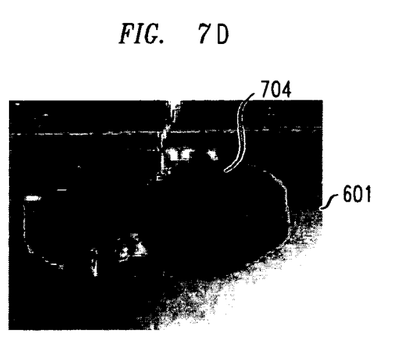

FIGS. 7A, 7B, 7C and 7D show how different liquids behave when disposed on the illustrative surface 601 of FIG. 6. FIG. 7A shows that, when a water droplet 701 with a surface tension (γ) of 72 mN/m is disposed on the surface 601, the droplet 701 retains a nearly spherical shape for the aforementioned reasons. FIGS. 7B, 7C and 7D show how for liquid droplets 702, 703 and 704, respectively, with decreasing surface tension (ethyleneglycol [γ=47 mN/m], cyclopentanol [γ=33 mN/m] and octanol [γ=27 mN/m], respectively) the droplets spread in increasing amounts over a greater area, with the droplet having the lowest surface tension (droplet 704) spreading to the greatest extent.

As used herein, unless otherwise specified, a "nanostructure" is a predefined structure having at least one dimension of less than one micrometer and a "microstructure" is a predefined structure having at least one dimension of less than one millimeter. The term "feature pattern" refers to either a pattern of microstructures or a pattern of nanostructures. Further, the terms "liquid," "droplet," and "liquid droplet" are used herein interchangeably. Each of those terms refers to a liquid or a portion of liquid, whether in droplet form or not. Additionally, medium, as used herein, is a gas or liquid in which a biological or chemical element may be present, as discussed herein below. Finally, intra-pattern characteristics, as used herein, are defined as a) characteristics of the individual feature pattern elements relative to other elements (as opposed to inter-pattern characteristics, which are macro characteristics of the feature pattern, such as orientation of the entire pattern), or b) certain characteristics of individual feature pattern elements such as shape, size, height and electrical characteristics.

Figure 8A:
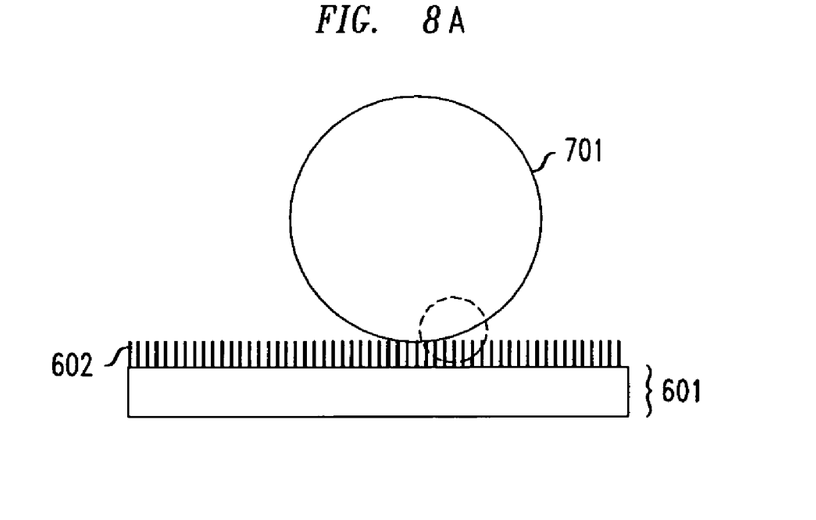
FIG. 8A shows a cross section of the droplet and nanostructure feature pattern of FIG. 7A.
Figure 8B:
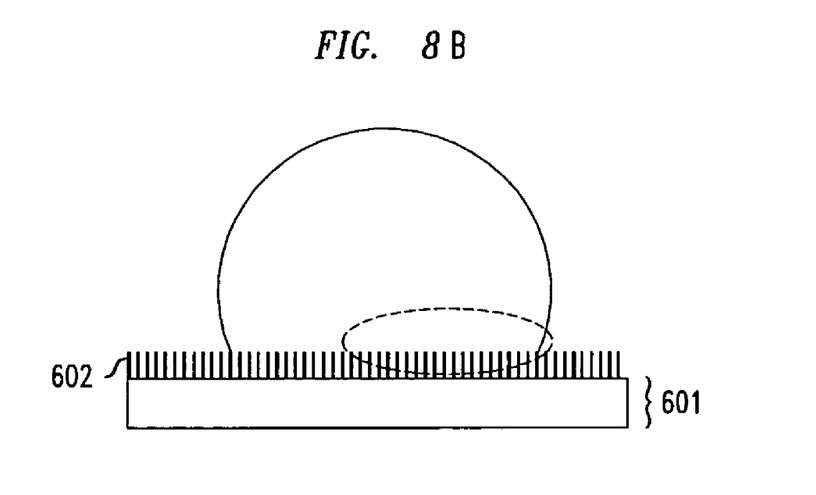
FIG. 8B shows a cross section of the droplet and nanostructure feature pattern of FIG. 7C.

FIGS. 8A and 8B show a cross-section illustration of the interactions between the nanostructured surface 601 of FIG. 6 and droplets of different liquids. FIG. 8A represents, for example, the droplet of water 701 of FIG. 7A. Due to the relatively high surface tension of the water, along with the intra-patern characteristics of the nanostructures, droplet 701 is suspended on the tops of the nanoposts 602 (shown in greater detail in FIG. 6) and, as previously discussed, has a very high angle of contact with the nanostructured surface 601. As a result, droplet 701 experiences very low flow resistance. FIG. 8B represents, illustratively, the droplet 703 of cyclopentanol of FIG. 7C. Compared to the droplet 701 of water of FIG. 8A, the droplet 703 of cyclopentanol is not suspended on the tops of the nanoposts 602. Instead, because of the relatively low surface tension of the liquid, the droplet 703 completely penetrates the surface 601, thereby coming into contact with the solid surface underlying the nanoposts 602. The droplet has a low angle of contact, relative to the droplet 701 of FIG. 8A and, due to the complete penetration of the nanostructured surface 601, experiences a very high flow resistance.

Figure 9A:
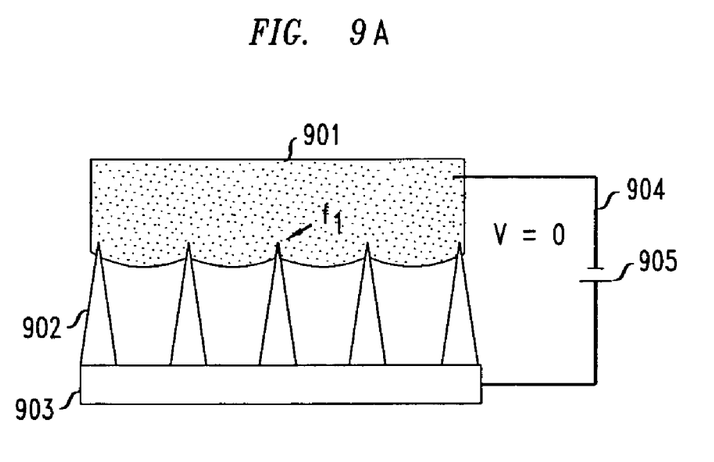
FIGS. 9A and 9B show a device in accordance with the principles of the present invention whereby the electrowetting principles of FIG. 5 are used to cause a liquid droplet to penetrate a nanostructure feature pattern.
Figure 9B:
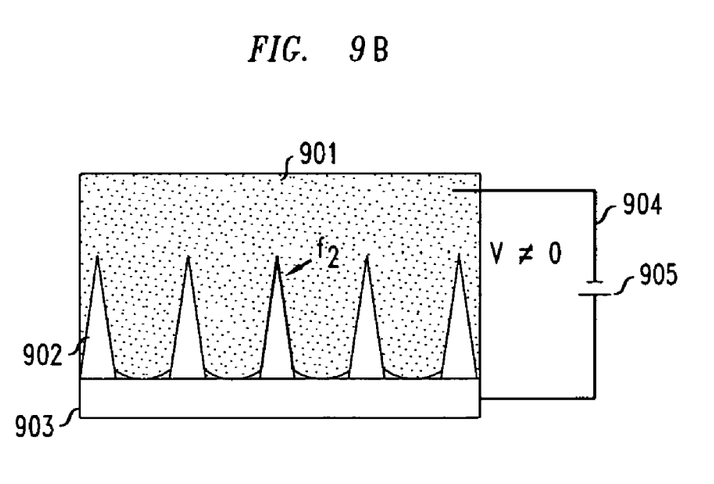

It is often desirable to be able to control the penetration of a given liquid into a given nanostructured or microstructured surface and, thus, control the flow resistance exerted on that liquid as well as the wetting properties of the solid surface. FIGS. 9A and 9B show one embodiment where electrowetting, similar to that used in the illustrative microlens of FIG. 2, is used to control the penetration of a liquid into a nanostructured surface.

Figure 10:
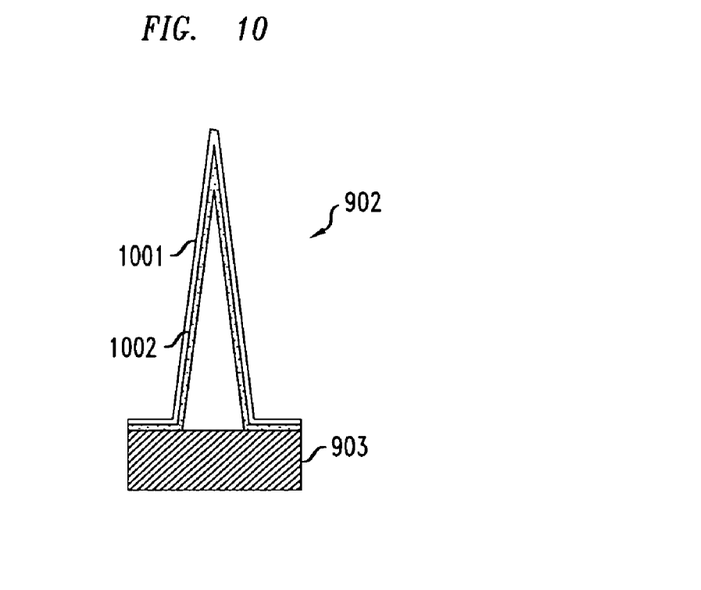
FIG. 10 shows the detail of an illustrative nanopost of the nanostructure feature pattern of FIGS. 9A and 9B.

Referring to FIG. 9A, a droplet 901 of conducting liquid is disposed on nanostructure feature pattern of conical nanoposts 902, as described above, such that the surface tension of the droplet 901 results in the droplet being suspended on the upper portion of the nanoposts 902. In this arrangement, the droplet only covers surface area $f_1$ of each nanopost. The nanoposts 902 are supported by the surface of a conducting substrate 903. Droplet 901 is illustratively electrically connected to substrate 903 via lead 904 having voltage source 905. An illustrative nanopost is shown in greater detail in FIG. 10. In that figure, nanopost 902 is electrically insulated from the liquid (901 in FIG. 9A) by material 1001, such as an insulating layer of dielectric material. The nanopost is further separated from the liquid by a low surface energy material 1002, such as a well-known fluoro-polymer. Such a low surface energy material allows one to obtain an appropriate initial contact angle between the liquid and the surface of the nanopost. It will be obvious to one skilled in the art that, instead of using two separate layers of different material, a single layer of material that possesses sufficiently low surface energy and sufficiently high insulating properties could be used.

FIG. 9B shows that, by applying a low voltage (e.g., 10–20 volts) to the conducting droplet of liquid 901, a voltage difference results between the liquid 901 and the nanoposts 902. The contact angle between the liquid and the surface of the nanopost decreases and, at a sufficiently low contact angle, the droplet 901 moves down in the y-direction along the surface of the nanoposts 902 and penetrates the nanostructure feature pattern until it complete surrounds each of the nanoposts 902 and comes into contact with the upper surface of substrate 903. In this configuration, the droplet covers surface area $f_2$ of each nanopost. Since $f_2 >> f_1$, the overall contact area between the droplet 901 and the nanoposts 902 is relatively high and, accordingly, the flow resistance experienced by the droplet 901 is greater than in the embodiment of FIG. 9A. Thus, as shown in FIG. 9B, the droplet 901 effectively becomes stationary relative to the nanostructure feature pattern in the absence of another force sufficient to dislodge the droplet 901 from the feature pattern. One skilled in the art will also recognize that other means of inducing penetration of liquid in nanostructured surfaces, such as those illustrative means described in the aforementioned copending U.S. patent application Ser. No. 10/403,159, can be used with equal effectiveness.

Figure 11:
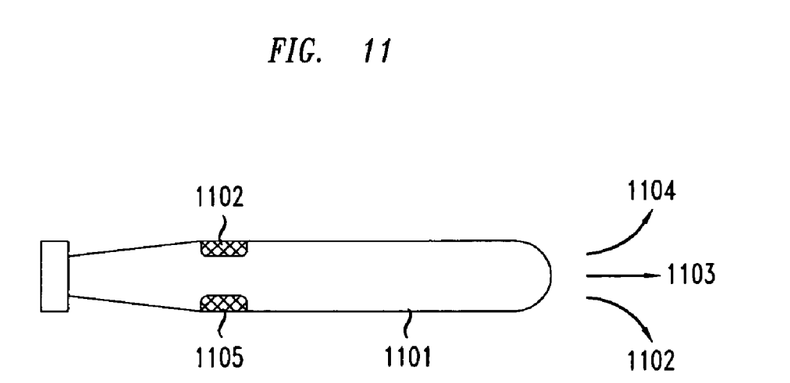
FIG. 11 shows an illustrative torpedo with nanostructured or microstructured surfaces.

In an underwater vehicle application, the principles described above can be used to cause the respective fluid through which the vehicle travels to penetrate the patterned surface of the vehicle. When such penetration is achieved, increased drag over the penetrated surface will result. It is well understood in the art that, depending on location of the penetration/drag, certain effects on the motion of the vehicle will result. For example, FIG. 11 shows the top view of an illustrative torpedo 1101 traveling in direction 1103. If water is caused to penetrate area 1102 on the surface of torpedo 1101, for example, the torpedo will turn in direction 1104. Alternatively, if water is caused to penetrate the surface 1105 of torpedo 1101, it will turn in direction 1106. Finally, if water is allowed to penetrate equal areas 1105 and 1102, the torpedo will travel in direction 1103, albeit at a slightly slower speed due to the friction experienced by the torpedo due to the penetration of the areas 1105 and 1102. One skilled in the art will recognize that the larger the areas of penetration, the greater the drag experienced by the penetrated surface. The penetration of the surfaces may be reversed by using a force sufficient to dislodge the fluid from the penetrated surface. Such a force may be, for example, a sonic or ultrasonic force applied to the penetrated areas 1105 and/or 1102. One skilled in the art will recognize that other forces may be used to reverse this penetration with equal effectiveness.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. An apparatus comprising:
    a surface on a body, said body adapted to move through a fluid; and
    a plurality of structures, said structures being nanostructures or microstructures, each nanostructure of said plurality of structures having at least one dimension of less than one micrometer, and each microstructure of said plurality of structures having at least one dimension which is less than one millimeter, wherein said plurality of structures are disposed in a pattern on said surface in a way such that friction between said surface and said fluid is controlled as a function of a surface energy of said structures and wherein said friction control is a function of a variable degree of contact between said surface and said fluid resulting from an electrically-induced penetration of at least a portion of said fluid through said structures disposed on said surface, each structure of said plurality of structures maintaining an orientation that is perpendicular to said surface of said body such that as said body moves through said fluid said fluid travels in a direction across a top of each said structure; and at least a first electrode adapted to facilitate said electrically-induced penetration by applying a voltage differential between said surface and said fluid in a way such that said fluid is caused to penetrate said pattern at a select location on said surface such that said penetration of said fluid at said select location alters a direction or a speed of said body in said fluid.

2. The apparatus of claim 1 wherein said body is an underwater vehicle.

3. An apparatus comprising:
a surface on a body, said body adapted to move through a fluid and wherein said body is a submarine; and
a plurality of nanostructures or microstructures operable to control friction between said surface and said fluid, each nanostructure of said plurality of nanostructures having at least one dimension of less than one micrometer, and each microstructure of said plurality of microstructures having at least one dimension which is less than one millimeter, disposed in a pattern on said surface in a way such that said friction between said surface and said fluid is controlled as a function of a surface energy of said nanostructures or microstructures and wherein said friction control is a function of a variable degree of contact between said surface and said fluid resulting from an electrically-induced penetration of at least a portion of said fluid through said nanostructures or microstructures disposed on said surface.

4. The apparatus of claim 3 further comprising at least a first electrode adapted to apply a voltage differential between said surface and said fluid in a way such that said fluid is caused to penetrate said pattern at a select location on said surface such that said penetration of said fluid at said select location alters a direction or a speed of said body in said fluid.

5. An apparatus comprising:
a surface on a body, said body adapted to move through a fluid and wherein said body is a torpedo; and
a plurality of nanostructures or microstructures operable to control friction between said surface and said fluid, each nanostructure of said plurality of nanostructures having at least one dimension of less than one micrometer, and each microstructure of said plurality of microstructures having at least one dimension which is less than one millimeter, disposed in a pattern on said surface in a way such that said friction between said surface and said fluid is controlled as a function of a surface energy of said nanostructures or microstructures and wherein said friction control is a function of a variable degree of contact between said surface and said fluid resulting from an electrically-induced penetration of at least a portion of said fluid through said nanostructures or microstructures disposed on said surface.

6. The apparatus of claim 5 further comprising at least a first electrode adapted to apply a voltage differential between said surface and said fluid in a way such that said fluid is caused to penetrate said pattern at a select location on said surface such that said penetration of said fluid at said select location alters a direction or a speed of said body in said fluid.

* * * * *